Figure 1:
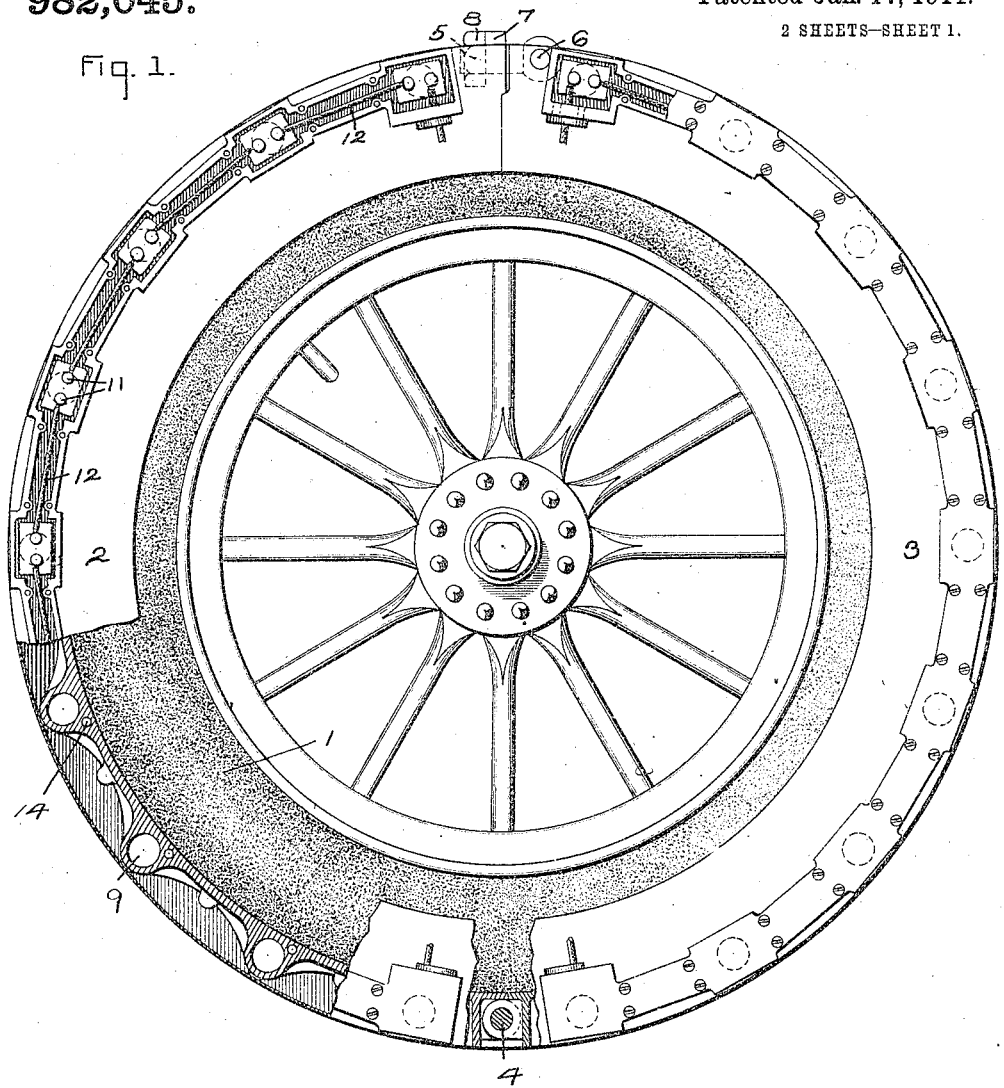

W. C. FISH & A. M. STANLEY.
ELECTRIC VULCANIZER.
APPLICATION FILED SEPT. 12, 1907.

982,045.

Patented Jan. 17, 1911.
2 SHEETS—SHEET 1.

WITNESSES
W. Ray Taylor.
Marcus L. Byng.

INVENTORS
WALTER C. FISH.
ARTHUR M. STANLEY.
by Albert G. Davis
ATTY.

W. C. FISH & A. M. STANLEY.
ELECTRIC VULCANIZER.
APPLICATION FILED SEPT. 12, 1907.
982,045.
Patented Jan. 17, 1911.
2 SHEETS—SHEET 2.
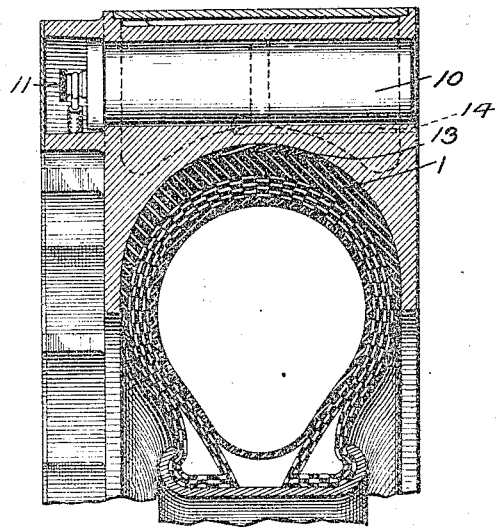
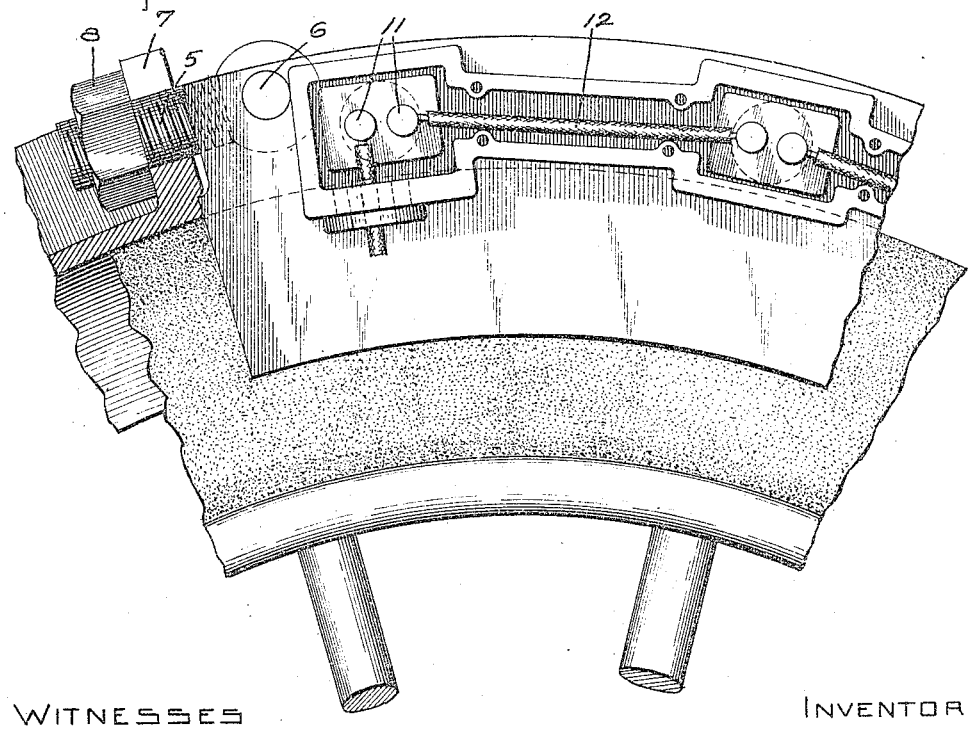
WITNESSES
W. Ray Taylor.
Marcus L. Byng.
INVENTORS
WALTER C. FISH.
ARTHUR. M. STANLEY
by Albert G. Davis
ATTY

UNITED STATES PATENT OFFICE.

WALTER C. FISH AND ARTHUR M. STANLEY, OF LYNN, MASSACHUSETTS, ASSIGNORS TO GENERAL ELECTRIC COMPANY, A CORPORATION OF NEW YORK.

ELECTRIC VULCANIZER.

982,045.   Specification of Letters Patent.   Patented Jan. 17, 1911.

Application filed September 12, 1907. Serial No. 392,456.

*To all whom it may concern:*

Be it known that we, WALTER C. FISH and ARTHUR M. STANLEY, citizens of the United States, residing at Lynn, county of Essex, State of Massachusetts, have invented certain new and useful Improvements in Electric Vulcanizers, of which the following is a specification.

This invention relates to devices for vulcanizing tires, and has for its object the provision of means whereby the tire may be vulcanized, either in whole or in part, by the application of an electric current in a reliable, safe and efficient manner.

In carrying out our invention, we provide a casing having a heat-conducting surface adapted to be brought into good thermal relation with the tire. This casing is preferably made so as to entirely inclose the tire, and as a matter of convenience in applying the same, is made in sections. A plurality of heating units are mounted around the casing in good thermal relation to the casing, the units being preferably of the self-contained removable type, the connections being such that any number of units may be included in the circuit at one time so that either the whole or part of the tire may be heated as desired.

In the accompanying drawings, in which we have shown our invention embodied in a concrete form, Figure 1 is a view of the tire having my device applied thereto, certain of the parts being broken away; Fig. 2 is a partial section of the casing; and Fig. 3 is a fragmentary view of the tire showing the details of the casing and connections of the heating units.

Referring to the drawings, 1 is a pneumatic tire for use on automobiles and the like, having a rubber tread which it is desired to vulcanize. A circular casing, preferably made entirely of metal, is formed in two sections, 2 and 3, pivoted together at 4 and having a clamping bolt 5 pivoted at 6 in section 3 and adapted to engage a yoke 7 in section 2, so that by screwing up the nut 8, the casing can be brought into good heat-conductive relation to the tire. The inner side of the casing is made to conform to the shape of the tire, as shown in Fig. 2, and a plurality of holes or pockets 9 are formed around the casing in close proximity to the tire. These pockets are adapted to receive heating units 10.

We have shown, for purposes of illustration, a cartridge unit which is described and claimed in patent to Stevens, No. 803,795, although the particular form of heating device and the specific arrangement thereof forms no part of our invention. The heating units are adapted to fit into the pockets so as to be in good thermal relation thereto, and the terminals 11 are brought out as shown. The units are then connected together in series or in any other desirable arrangement, by means of conductors 12. When it is desired to heat the entire tire, the units are all connected in series, whereas if only a portion of the tire is to be heated, the heating units adjacent said portion may be energized and the others disconnected. When it is desired to repair the tire, as for instance to apply a tire tread thereto, a strip of rubber 13, impregnated with sulfur, is placed around the tire and the casing is clamped over the tire. The current is then turned on and the casing is brought up to the temperature to cause vulcanization. The temperature may be taken at points around the tire by placing a thermometer in the holes 14. It will be seen therefore that a uniform temperature may be applied to a tire in a very simple manner, and that little or no experience or skill is required. The device is so proportioned and arranged that the casing will be brought up to a definite temperature and the current can be simply turned on and left until the vulcanization is complete.

It will be understood, of course, that various modifications will suggest themselves to those skilled in the art without departing from the spirit of our invention, the scope of which is set forth in the annexed claims.

What we claim as new and desire to secure by Letters Patent of the United States, is,—

1. A tire vulcanizer comprising a sectional casing and a plurality of self-contained heating units mounted at intervals around said sections.

2. A tire vulcanizer comprising a circular casing composed of segmental sections and a plurality of heating units mounted at intervals around the circumference of said casing.

3. A tire vulcanizer comprising a circular casing composed of semi-circular sections and a plurality of heating units mounted at intervals around the circumference of said casing.

4. A tire vulcanizer comprising a circular casing composed of semi-circular sections pivoted together and a plurality of heating units mounted at intervals around said casing.

5. A tire vulcanizer comprising a casing composed of semi-circular sections pivoted together, a plurality of self-contained heating units mounted at intervals around said casing, and connections whereby any number of said units may be heated as desired.

6. A tire vulcanizer comprising a sectional casing, a plurality of self-contained heating units mounted at intervals around each section and connections for heating as many of said units as desired.

7. A tire vulcanizer comprising a casing composed of segmental sections, a plurality of self-contained heating units mounted at intervals around each section and connections whereby any number of said units may be heated as desired.

In witness whereof, we have hereunto set our hands this ninth day of September, 1907.

WALTER C. FISH.
ARTHUR M. STANLEY.

Witnesses:
JOHN A. McMANUS, Jr.,
VICTOR H. McGUFFIN.